INVENTOR.
PAUL J. WEAVER
BY
ATTORNEYS.

United States Patent Office 3,616,716
Patented Nov. 2, 1971

3,616,716
MEANS FOR EXERTING A CONTINUOUS PATH CONTROL FROM A REMOTE LOCATION
Paul J. Weaver, San Marino, Calif., assignor to Automatic Control Systems, Inc., El Monte, Calif.
Filed Oct. 30, 1969, Ser. No. 872,547
Int. Cl. B23b 3/28; B23c 1/18
U.S. Cl. 82—14 A                    8 Claims

ABSTRACT OF THE DISCLOSURE

A control system for controlling the movement of an element such as a cutting tool under continuous path control, the plane of said path relating to two coordinate axes. The device includes a pair of non-parallel working slides and remotely located control slide means for holding a pair of templates which bear positioning information relative to respective coordinate axes. A tracer mechanism is provided to respond to each of the templates, and through a hydraulic link which forms a portion of a power system, to control the respective motion of the working slides, thereby to move the cutting tool along a continuously controlled path. The templates are driven simultaneously, and are of indefinite length so that a plurality of paths representing a plurality of cutting passes can be made with one template for each axis. The controls can be located at a distance from the working element, and the motions may be hydraulically dimensionally amplified, if desired.

---

This invention relates to machine tool controls utilizing tracer mechanisms. Cutting tools will be used as a specific example herein, but it will be understood that other devices requiring positioning of a working element may be used instead.

Tracer-controlled machine tool systems are well known. The function of a conventional tracer mechanism is to respond to the contour of a template or pattern so as to shift the machine tool element that carries a cutting tool to cause the traversal of a specific path in space so as to duplicate the shape of a template and the part.

Existing tracer technology has serious limitations, principally, that the contour of the template must be identical to the contour of the part, and can therefore define only one single point in space at any axial location along the path. Therefore, it is an inherent limitation that a conventional tracer can provide only one pass per template, and a complete part cannot be produced by simple tracer operations, except for unusually simple parts. Accordingly, tracer-controlled systems have come to be thought of as "finishing" systems, with the rough and intermediate cutting operations performed by other devices. This leads to significant increases in cost of articles produced by such techniques.

It is an object of this invention to free tracer-controlled machine tools from such limitations, to provide a means whereby templates can be manufactured more readily to closer tolerances than heretofore possible, and without any necessary resemblance to the part to be produced, to permit a plurality of passes to be made from a single template, and to maintain a continuous path control over the device within its plane of operation.

It is another object of the invention to enable the controls to be located in any desired distance from the machine itself, so that the machine can operate in hazardous areas without requiring the immediate presence of either the operator or of the controls.

It is still another object of the invention to enable the device to move in a dimensionally "amplified" manner.

A control system according to this invention is utilized in combination with a machine such as a machine tool, which has a fixed base that carries a first working slideway and slide, and upon the first slide, a second working slideway and slide whereby the second working slide may be moved throughout an entire operational plane. A working element such as a cutting tool is carried by the second slide so as to be positionable to cut a contour in a workpiece, which, in the case of a lathe, is held by a chuck.

Control slideway means mounts control slide means by which a first and a second template are moved past respective first and second tracer mechanisms. These tracer mechanisms are linked to tracer drive motors which shift the tracer mechanisms to follow the edge of the template. The tracer drive motors are hydraulically linked to motor means which respectively drive the first and the second working slides so that the working slides move with the tracer mechanisms, even though they are not directly mounted to one another. The control slide means drives the templates synchronously so that relative to the working slides, each position of the templates along their axes of motion defines a position in space unique to the rise of each of the template edges from a datum line. It therefore follows that by varying the distance from the datum line the cutting tool may be positioned at any location within the operating limits of the device, and it also enables a plurality of passes to be made with a single set of template edges.

The invention will be fully understood from the following detailed description and the accompanying drawings, in which.

Figure 1:
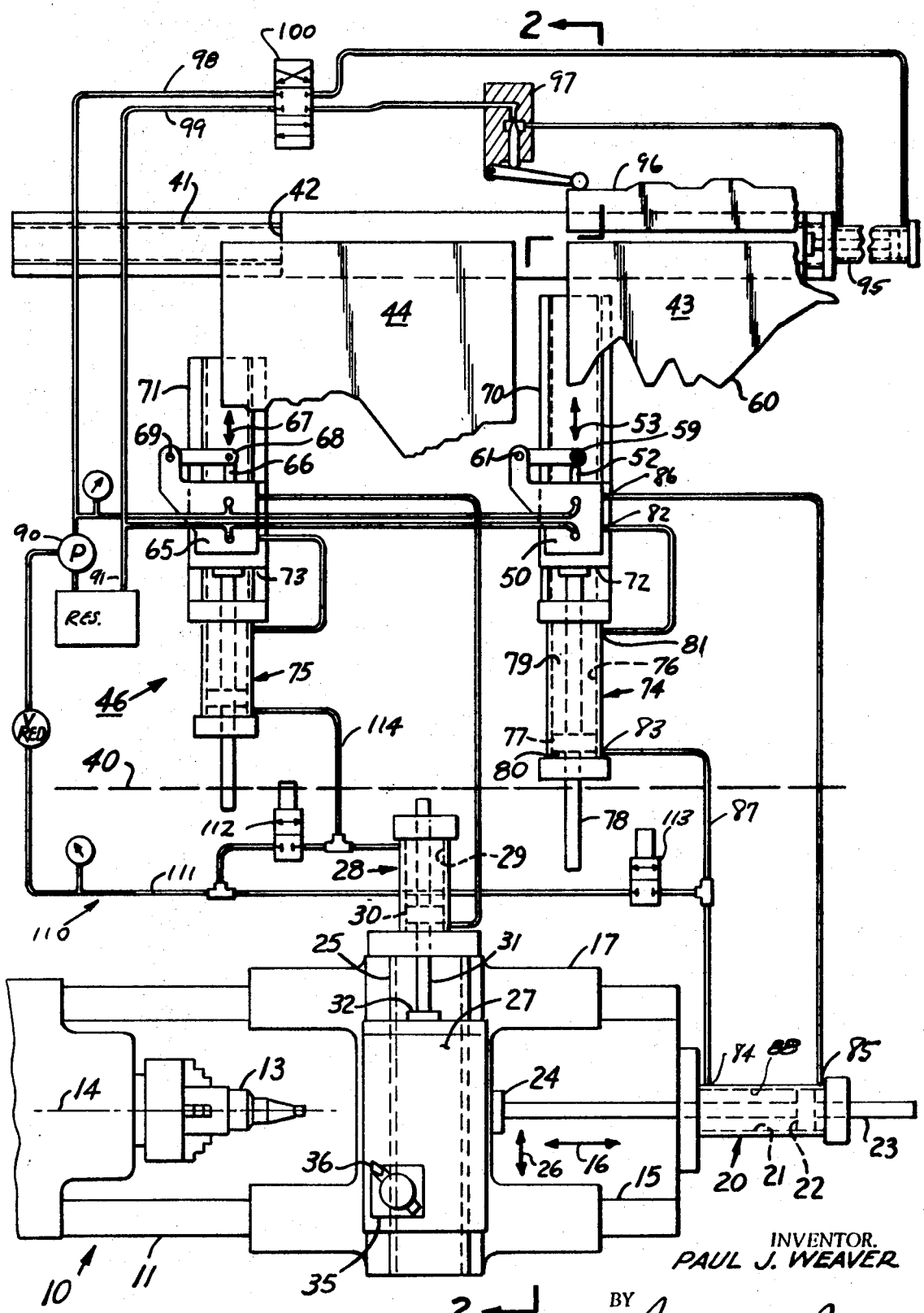
FIG. 1 is a plan view showing a machine tool incorporating the invention.
Figure 2:
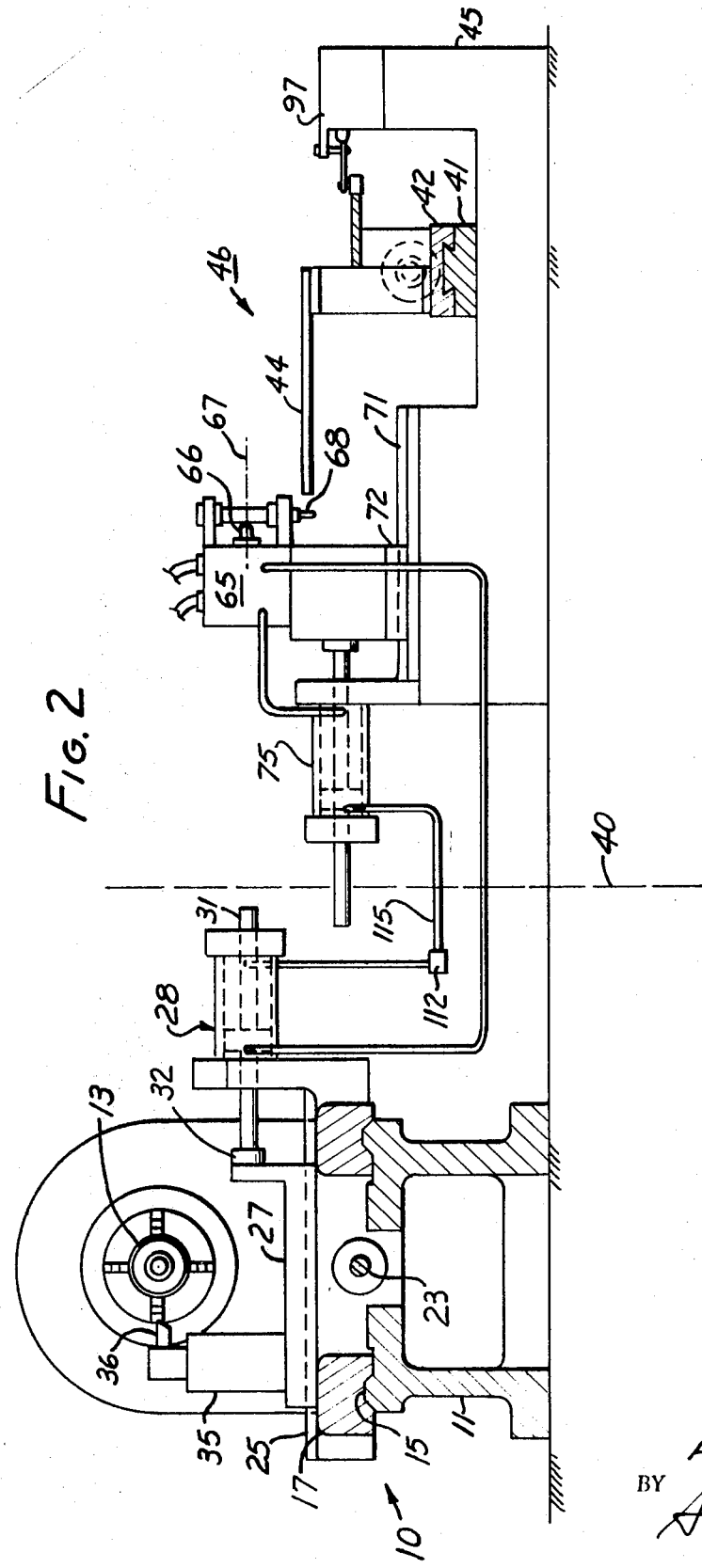
FIG. 2 is a side view partly in cutaway cross section taken at line 2—2 of FIG. 1.

In FIG. 1, there is shown a lathe 10 having a base 11 that supports a power-driven chuck which, in turn, holds a workpiece 13 and turns it around an axis of rotation 14. The purpose of the control system is to move a cutting tool so as to form a contour on the workpiece. This is only one example of the use of this system. Any system requiring positioning may use it, such as in materials handling, foundry operations or the like.

A first working slideway 15 is formed on the base and extends along first coordinate axis 16 (sometimes called the Z axis). Atop the first working slideway is a first working slide 17 mounted thereto in conventional manner so as to be reciprocally movable along the first working slideway. A first bi-directional motor means 20 is interposed between slideway 15 and slide 17 so as to drive the slide. It may conveniently comprise a cylinder 21 with a piston 22 and rod 23, the rod being connected by brackets 24 to the first working slide.

A second working slideway 25 is formed atop the first working slide. It extends along a second coordinate axis 26 (which is sometimes called the X axis). It is non-parallel to axis 16, and is customarily normal thereto in plan view. A second working slide 27 is mounted to slideway 25 for reciprocally moving thereon. A second bi-directional motor means 28 is interposed between the second working slideway and the second working slide for reciprocally moving the second working slide along its respective slideway. Again, motor 28 may comprise a cylinder 29 mounted to the second working slide, a piston 30, and a rod 31, which is connected by bracket 32 to the second working slide.

A tool mount 35 is mounted to the top of the second working slide, so as to support a cutting tool 36. The cutting tool is movable throughout its range of operation in the X-Z plane, by the working slide system.

A wall 40 is shown dividing the machine itself from a control segment 41 and illustrates the advantages obtainable by separating the two. The machine may operate in a contaminated area without requiring the immediate presence of an operator.

Control slideway means 41 and control slide means 42 are shown as single units, means 42 mounting a first and a second template 43, 44. Base 45 acts as a support for the control segment, and the control slideway means is mounted to it. The control slide means and control slideway means could, if desired, be diveded into two parts, each supporting one of the templates so that these could be disposed at any desired relationship relative to each other. In that event, they would be driven synchronously at the same velocity relative to their respective tracer mechanisms, yet to be described. However, it is a convenience of this invention in that by detaching the controls from the machine tool itself, one is enabled to mount both templates on the same slide thereby greatly simplifying the construction of the control segment.

The first and second templates are respective to the X and Z axes. They move along template movement axes which are parallel to their respective control slideway means.

A first tracer mechanism 50 is mounted to a base 45. The tracer mechanism is of the type generally recognized as a "tracer valve" whose function is that of a four-way valve having a null condition when in a centralized position, and a pair of operating conditions on each opposite side of null, where flow is provided in one direction or in the opposite direction through members of a pair of motor supply ports. Operation of this well-known class of valve is fully disclosed in United States Rosebrook Pat. No. 2,753,145, to which reference may be made for more details.

The tracer includes a stem 52 which has freedom of motion along a control axis 53 that lies normal to the template motion action (the axis of control slideway means 41). A follower 59 follows the edge 60 of the first template. The follower is biased against the template. The follower is pivoted at a hinge 61 which is mounted to the body of the tracer mechanism to provide for the tracing of the template edge by the follower. The follower is biased lightly against the stem of the tracer valve.

A second tracer mechanism 65 is mounted to the base 51. It is identical to tracer mechanism 50, having a stem 66 with a control axis 67. The stem abuts a follower 68 mounted by a hinge 69 to the body of the tracer.

Tracer slideways 70 and 71 are provided for the first and second tracer mechanisms, respectively, and support tracer slides 72 and 73, respectively. Tractor motors 74, 75 are under control of their respective tracer valves so as to shift toward and away from the template in response to the reaction between the follower and the template edge. The tracer motors are identical so that only tracer motor 74 will be described in detail.

This is respective to the axis Z (axis 16). Motor 74 includes a cylinder 76 with an internal piston 77 and a double-ended rod 78. The piston divides the cylinder into chambers 79, 80, to which ports 81, 82 connect. Port 81 is connected to one port 82 of the tracer valve, which is one of the motor supply ports of the four-way valve. The other port 83 of the motor is connected to port 84 of the first motor means 20, at one side of its piston by line 87 which has a constant volume so that the total volume in line 87 chamber 80 of motor 74, and chamber 88 of motor 20, is constant. These volumes are interconnected and serially arranged, so that movement of the tracer motor moves the working motor by supplying to or receiving from motor 20 the same volume as received or supplied by motor 20. Therefore the motors are in a master-slave relationship for concurrent and equal movement. Port 85 at the other side of motor 20 and motor supply port 86 are interconnected.

At this point, it should be noted that a differential axial motion is possible by providing a different cross-section area on one piston than is provided on the other. The motion will be amplified in inverse proportion to the respective areas.

The connections between motors 28 and 75 are identical to those just described, and are not separately described herein. The tracer valve connections are those which can be seen in United States Pat. No. 2,753,145, whereby pressure from a pressure supply 90 is provided to the tracer valve and exhaust is returned to reservoir through exhaust line 91. The working of the tracer valve is such as to send fluid under pressure to one or the other of its motor supply ports 82 and 86 when the spool therein is displaced from its null condition. It will thereby be seen that the operation of the tracer motors which receive fluid under pressure to cause them to perform work and move the tracer valve is duplicated in the working slides.

A template drive motor 95 is interposed between slideway 41 and control slide means 42. It may conveniently comprise a piston cylinder motor and serve to drive the templates along their respective axes.

A rate control template 96 may be mounted to means 42, and governs power control means 97 such as a metering valve which determines the rate of motion by metering fluid under pressure through a supply line to motor 95. It will be noted that lines 98 and 99 proceed through a selector valve 100 which has a closed position for setup operations and reversible flow connections for causing the motor to move in one direction or the other.

A hydraulic reset circuit 110 is maintained at a pressure less than that of the main pressure supply circuit and includes a pressure manifold 111 which is connected to a pair of solenoid off-on valves 112, 113. When the circuit is at rest between passes, the solenoid valves are opened so as to place lines 87 and 114 under this lesser pressure. This pressure does not move the motors, because the tracer motors will be bottomed out and the higher system pressure holding them in the position shown. This lesser pressure does assure that lines 87 and 114 are filled with hydraulic fluid, thereby replacing that which may have leaked out and also standardizing the circuit relative to changes in temperature. Valves 112 and 113 are closed while the control circuits are in operation.

The operation of this device will now be described. The theory of operation of the device may be found in greater detail by reference to applicant's copending patent application, Ser. No. 872,492, filed Oct. 30, 1969, entitled, "Machine Control Utilizing a Plurality of Control Templates and Tracer Mechanisms." It suffices to say for present purposes that template 43 causes motion of the tracer slide that is reflected by an equal motion of the first working slide and thereby tends to longitudinal (Z axis) motion. The location of the cutting tool relative to the axis is therefore a function of the displacement of the edge of the template from its base or datum line.

Template 44 is respective to the position along the X axis and its motion past tracer valve 65 will be reflected by motion of the second tracer valve which, in turn through its respective tracer motor, causes movement of the second motor 28 and motion along the second coordinaate axis so that there is a direct correlation between the cross (X axis) position of the second working slide and the edge of template 44. It will thereby be seen that driving these templates will define a unique position in space at each axial position of the templates which is accomplished through the hydraulic link between the tracer motor and the respective working motor.

This device provides an accurate means for linking two axis motions, and for causing an accurate master-slave relationship between an element to be positioned and a pair of templates.

This invention is not to be limited by the embodiment shown in the drawings and described in the description which is given by way of example and not of limitation, but only in accordance with the scope of the appended claims.

I claim:
1. A control system for controlling the movement of an element relative to a fixed base along a path related to a first and a second coordinate axis, the position of the element along said path being under continuous control of the system, said system comprising: a first working slideway extending parallel to the first coordinate axis and mounted to the base; a first working slide mounted to the first working slideway for axial reciprocal movement thereon; a second working slideway extending parallel to the second coordinate axis and mounted to the first working slide for movement therewith; a second working slide mounted to the second working slideway for axial reciprocal movement thereon; first bi-directional motor means drivingly interposed between the base and the first working slide adapted to drive the first working slide in a direction parallel to the first coordinate axis; second bi-directional motor means drivingly interposed between the first and second working slides adapted to drive the second working slide in a direction parallel to the second coordinate axis; control slideway means; control slide means slidably mounted to the control slideway means adapted to move a pair of templates along respective template movement axes; a first and a second tracer valve having a respective first and second control axis, the control axes being normal to the respective template movement axis; control drive means driving the control slide means along the respective template movement axis; a first and a second tracer slideway; a first and a second tracer slide mounted to said slideway; said first and a second tracer valve respectively mounted to the tracer slides, each having a respective first and second control axis aligned with the respective tracer slideway; a first and a second tracer motor for bi-directionally driving the tracer slide along the respective tracer slideway under the control of the respective tracer valve, the motor means and the tracer motors being piston-cylinder motors, the displacement of one powering the movement of the other, and two opposite signals causing operation of the tracer motor in each of the directions as a function of its reaction with a template mounted to the control slide means as the template moves past the tracer valve along the respective tracer movement axis, whereby the movement of the tracer mechanisms along their control axes is proportionally responded to by movement of the first and second working slides along the first and second working slideways; and element holder means mounted to the second working slide, whereby driving the control slide means causes templates held by them to interact with the respective tracer mechanisms to determine a unique point in space for the element holder means which is a function of the location of the points of contact between the tracer mechanisms and templates.

2. A control system according to claim 1 in which the bi-directional motor means driving the working slides and the tracer motion are fluidly connected by a conduit of constant volume.

3. A control system according to claim 2 in which the cross-sectional area of one of the bi-directional motor means differs from that of its respective tracer motor, whereby the movement of the respective working slide is proportional to but different from, the movement of the respective tracer valve.

4. A control system according to claim 1 in which the control slideway means comprises a single slide and in which the control slide means comprises a single slide to which the templates are mounted.

5. A control system according to claim 4 in which a template respective to another control function is mounted to the control slide means.

6. A control system according to claim 1 in which a template respective to another control function is mounted to the control slide means.

7. A control system according to claim 1 in which a fluid reset circuit is provided comprising a source of fluid under pressure, a conduit fluidly connecting to that conduit which transmits the displaced fluid from one motor to another, and a shut-off valve connected between the source and the said circuit.

8. A control system according to claim 1 in which each bi-directional motor means is fluidly connected to its respective tracer motor by a conduit of constant volume, and in which a fluid reset circuit is connected to said conduit and to a source of fluid under pressure, there being a shut-off valve in said conduit between the pressure source and each of said conduits.

References Cited
UNITED STATES PATENTS

| | | | |
|---|---|---|---|
| 3,262,647 | 7/1966 | Harrison | 82—14 R X |
| 3,272,039 | 9/1966 | Weaver | 82—14 R |
| 3,340,772 | 9/1967 | Weaver | 82—13 B |

GIL WEIDENFELD, Primary Examiner

U.S. Cl. X.R.

90—13 B

CERTIFICATE OF CORRECTION

Patent No. 3,616,716     Dated November 2, 1971

Inventor(s) Paul J. Weaver

It is certified that error appears in the above-identified patent and that said Letters Patent are hereby corrected as shown below:

Column 3, line 9

"diveded" should read --divided--

Column 4, line 62

After "templates" insert -- simultaneously.--

Signed and Sealed this

First Day of March 1977

[SEAL]

Attest:

RUTH C. MASON
*Attesting Officer*

C. MARSHALL DANN
*Commissioner of Patents and Trademarks*